United States Patent Office 3,826,774
Patented July 30, 1974

3,826,774
RESINOUS COMPOSITIONS BASED ON POLYVINYLIDENE FLUORIDE
Edmond Demillecamps, Wavre, and Ghislain Danguy, Brussels, Belgium, assignors to Solvay & Cie, Brussels, Belgium
No Drawing. Filed Dec. 13, 1972, Ser. No. 314,664
Claims priority, application Luxembourg, Jan. 18, 1972, 64,603
Int. Cl. C08f 45/04
U.S. Cl. 260—41 B    9 Claims

ABSTRACT OF THE DISCLOSURE

The invention relates to resinous compositions based on poly(vinylidene fluoride) comprising from 30 to 55% by weight of a polyamide of high molecular weight resulting from the polycondensation of terephthalic acid and at least one branched diamine containing 6 carbon atoms in its main chain.

The resinous compositions have higher impact strength than poly(vinylidene fluoride).

---

The present invention relates to resinous compositions based on poly(vinylidene fluoride) possessing improved impact strength.

It is known that poly(vinylidene fluoride) has a number of excellent properties, such as thermal stability, resistance to oxidation, resistance to chemical and atmospheric agents, electrical resistance, and finally resistance to wear. Nevertheless, these mechanical properties are sometimes insufficient for certain applications.

The Applicants have observed that by incorporating in poly(vinylidene fluoride) a polyamide resulting from the polycondensation of terephthalic acid and a branched diamine containing 6 carbon atoms in the main chain, its mechanical properties and particularly its impact strength are substantially improved.

The present invention therefore relates to resinous compositions based on poly(vinylidene fluoride) possessing improved impact strength, which are characterised in that they contain 30–55% by weight of a polyamide of high molecular weight resulting from the polycondensation of terephthalic acid and at least one branched diamine containing 6 carbon atoms in its main chain.

The properties of the resulting resinous compositions according to the present invention depend on the quantity and the nature of the polyamide incorporated.

Whereas the utilisation of amounts of polyamide lower than 30% by weight referred to the combined weights of poly(vinylidene fluoride) and polyamide does not improve impact strength, it is observed that the incorporation of amounts of polyamide varying between 30 and 55% of the total weight of the composition makes it possible to obtain particularly high and entirely unexpected impact strength.

When the content of polyamide is increased up to more than about 55% by weight, the impact strength of the composition is abruptly reduced.

It is preferred to incorporate amounts of polyamide varying between 40 and 50% by weight referred to the combined weights of the vinylidene fluoride polymer and polyamide, in order to obtain the compositions which are of the greatest interest from the point of view of impact strength.

Taking into account the aim pursued, the nature of the polyamide used is critical. Thus, different mixtures of various compositions have been prepared from a vinylidene fluoride polymer with other polyamides, in this particular instance polyamides derived from 6-aminocaproic acid on the one hand and polyamides derived from aminoundecanoic acid on the other hand, and it has been found that the constituents of the mixture are totally incompatible. It is impossible to convert the resulting mixtures into finished products and consequently to evaluate their mechanical properties, which thus are not measurable. It is preferred to use branched diamines whose main chain is substituted by alkyl groups in which the number of carbon atoms is between 1 and 12, preferably between 1 and 4. Use is preferably made of diamines, such as 2-ethylhexamethylenediamine, 2-methyl-4-ethyl-hexamethylenediamine, 2,2, 4- and 2,4,4-trimethylhexamethylenediamine, 3-methyl- and 2-methyl-hexamethylenediamine and mixtures thereof. The best results are obtained with mixtures containing more than 30% by weight of 2,2,4- and 2,4,4-trimethylhexamethylenediamines.

By poly(vinylidene fluoride) is here understood any vinylidene fluoride polymer and also copolymers containing at least 90% by weight of this monomer.

The polyamide may be mixed with the poly(vinylidene fluoride) in any suitable manner. Thus, the polymers may be mixed at high temperature by means of a Banbury mixer and/or of a grinder. For example, the polyamide is mixed with the poly(vinylidene fluoride) by gelling at 225° C. in a 2-cylinder kneader, followed by pressing at 205° C.

The impact strength of the compositions according to the invention can conveniently be evaluated by their tensile resilience. This is greater than that of each of the two constituents and attains its maximum value in the concentration range described above.

In addition, the modulus of rigidity of the compositions according to the invention is higher than that of poly(vinylidene fluoride).

These two advantageous properties make it possible to widen the fields of application of poly(vinylidene fluorides), particularly in the production of piping intended for conveying hot fluids.

As is well known to those skilled in the art, other ingredients, such as stabilisers, lubricants, fillers, dyes, pigments, plasticisers, and various adjuvants may be incorporated in the compositions.

More particularly, the addition of pigments, for example titanium dioxide, in an amount of up to about 40% by weight referred to the total amounts of poly(vinylidene fluoride) and polyamide, although it has the effect of reducing the tensile resilience of the mixture, nevertheless maintains it at a level higher than that of pure poly(vinylidene fluoride). The addition of pigment provides the not negligible advantage of bringing about a reduction of the coefficient of linear expansion of the mixture. Objects made from pigmented mixtures therefore have better dimensional stability in dependence on temperature. Furthermore, a substantial improvement of electrical properties, such as dielectric constant measured in dependence on frequency, and also loss angle is observed.

Examples 1 and 2 are given by way of comparison.

Examples 3 to 6 illustrate the present invention without in any way limiting its scope.

Quantities and percentages are expressed in parts by weight.

Tensile resilience is determined in accordance with the standard DIN 53 448, modified in that test specimens of a minimum width of 5 mm. are used.

The coefficient of linear expansion is measured with the aid of a NETSCH type 402 T low temperature dilatometer. The length of the specimens is generally 27 mm., but may be as high as 50 mm. The coefficient of linear thermal expansion is determined between $-30$ and $+30°$ C. It is obtained by calculating the slope of the diagram of elongation of the specimen plotted against temperature, these two variables being linear functions of time, with the aid of a heating rate programmer:

$$\alpha = \frac{\Delta L}{L} \cdot \frac{1}{\Delta T} \text{ expressed in mm./mm.° C.}$$

Example 1

80 parts of a vinylidene fluoride homopolymer, whose tensile resilience is of the order of 280 kg. cm./cm.$^2$, are mixed with 20 parts of the transparent, amorphous polyamide resulting from the polycondensation of terephthalic acid and a mixture of different isomers of trimethylhexamethylenediamine essentially based on 2,2,4- and 2,4,4-isomers, the polyamide having a melting point between 190 and 220° C. and a tensile resilience of 301 kg. cm./cm.$^2$.

Mixing is effected by gelling at 225° C. in a 2-cylinder kneader, followed by pressing at 205° C. and cooling under pressure.

The composition has a tensile resilience of 183 kg. cm./cm.$^2$.

Example 2

By the mode of operation described in Example 1 a composition is prepared which contains 20 parts of poly(vinylidene fluoride) identical to that in Example 1, and and 80 parts of the polyamide described in Example 1.

The tensile resilience of the composition has a value of 167 kg. cm./cm.$^2$.

Example 3

By the mode of operation described in Example 1, 60 parts of poly(vinylidene fluoride) possessing a tensile resilience of the order of 280 kg. cm./cm.$^2$, a coefficient of linear expansion of 14.7×10$^{-5}$ mm./mm.° C. and a modulus of rigidity, determined at 120° C. at 35° arc of 1600 kg./cm.$^2$ (ASTM D 1043-61 T), are mixed with 40 parts of the polyamide described in Example 1, which possesses a coefficient of linear expansion of 6.2×10$^{-5}$ mm./mm.° C. and a modulus of rigidity of 5000 kg./cm.$^2$.

The composition has a tensile resilience of 551 kg. cm./cm.$^2$, a coefficient of linear expansion of 13.6×10$^{-5}$ mm./mm.° C., and a modulus of rigidity at 120° C. of 2500 kg./cm.$^2$.

Example 4

By the mode of operation described in Example 1 a composition is prepared which contains 60 parts of poly(vinylidene fluoride) identical to that of Example 1, 40 parts of the polyamide described in Example 1, and 15 parts of titanium dioxide.

The composition has a tensile resilience of 508 kg. cm./cm.$^2$ and a coefficient of linear expansion of 12.1×10$^{-5}$ mm./mm.° C.

Example 5

By the mode of operation described in Example 1 there is prepared a composition containing 50 parts of poly(vinylidene fluoride) identical to that of Example 1, together with 50 parts of the polyamide described in Example 1.

The tensile resilience of the composition is 529 kg. cm./cm.$^2$.

Example 6

In accordance with the mode of operation described in Example 1 50 parts of poly(vinylidene fluoride), identical to that of Example 1 and having a tensile resilience of 280 kg. cm./cm.$^2$, 50 parts of the polyamide described in Example 1, and 30 parts of titanium dioxide are mixed.

The tensile resilience of the mixture is 380 kg. cm./cm.$^2$.

What is claimed is:

1. A high impact strength resinous composition based on poly(vinylidene fluoride) and comprising from 30 to 55% by weight of high melocular weight polyamide which is polycondensate of terephthalic acid and at least one branched diamine containing 6 carbon atoms in its main chain.

2. A high impact strength resinous composition according to claim 1 which contains from 40 to 50% by weight of the polyamide.

3. A resinous composition according to claim 1 which is a mixture of poly(vinylidene fluoride) and a high polymer polycondensate of terephthalic acid and a mixture of diamines containing more than 30% by weight of 2,2,4- and 2,4,4-trimethylhexamethylenediamines.

4. A resinous composition according to claim 1 which contains a pigment in an amount of up to about 40% by weight of a mixture of the two polymers.

5. A resinous composition according to claim 4 wherein the pigment is titanium dioxide.

6. A process for obtaining a high impact strength resinous composition based on poly(vinylidene fluoride) according to claim 1 which comprises mixing from 70 to 45% by weight of poly(vinylidene fluoride) with from 30 to 55% by weight of a high molecular weight polyamide which is polycondensate of terephthalic acid and at least one branched diamine containing 6 carbon atoms in its main chain.

7. A polyamide/poly(vinylidene fluoride) admixture which contains from 30 to 55% by weight of the polyamide and wherein
   the poly(vinylidene fluoride) is vinylidene fluoride polymer or copolymer containing at least 90% by weight of vinylidene fluoride and
   the polyamide is high molecular weight polycondensate of (a) terephthalic acid and (b) at least one branched-chain diamine having a main chain of 6 carbon atoms, and is compatible with said poly(vinylidene fluoride).

8. An admixture according to claim 7 which consists essentially of the polyamide and the poly(vinylidene fluoride).

9. An admixture according to claim 7 in combination with pigment, the amount of pigment being up to about 40% by weight based on the weight of the admixture.

References Cited

UNITED STATES PATENTS

| | | | |
|---|---|---|---|
| 3,340,222 | 9/1967 | Fang | 260—41 |
| 3,150,117 | 9/1964 | Gabler | 260—78 |

LEWIS T. JACOBS, Primary Examiner

E. S. PARR, Assistant Examiner

U.S. Cl. X.R.

260—37 N, 857 UN